US011139511B2

(12) United States Patent
Zheng et al.

(10) Patent No.: US 11,139,511 B2
(45) Date of Patent: Oct. 5, 2021

(54) CONTROL CIRCUIT, BATTERY HAVING THE CONTROL CIRCUIT AND BATTERY CONTROL METHOD

(71) Applicant: SZ DJI TECHNOLOGY CO., LTD., Shenzhen (CN)

(72) Inventors: Dayang Zheng, Shenzhen (CN); Lei Wang, Shenzhen (CN); Wentao Wang, Shenzhen (CN); Juncheng Zhan, Shenzhen (CN); Bogao Xu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 360 days.

(21) Appl. No.: 15/858,743

(22) Filed: Dec. 29, 2017

(65) Prior Publication Data
US 2018/0123183 A1   May 3, 2018

Related U.S. Application Data

(63) Continuation of application No. PCT/CN2015/082608, filed on Jun. 29, 2015.

(51) Int. Cl.
*H01M 10/42*   (2006.01)
*H02J 7/00*   (2006.01)
(Continued)

(52) U.S. Cl.
CPC ..... *H01M 10/4257* (2013.01); *H01M 10/425* (2013.01); *H01M 10/48* (2013.01);
(Continued)

(58) Field of Classification Search
CPC .. H01M 10/4257; H01M 2/02; H01M 10/425; H02J 7/00
See application file for complete search history.

(56) References Cited

U.S. PATENT DOCUMENTS 3,858,184 A    12/1974  Devries
5,710,931 A *  1/1998   Nakamura ............ G06F 1/3203
                                                    713/323
(Continued)

FOREIGN PATENT DOCUMENTS

CN    1109186 A    9/1995
CN    1142085 A    2/1997
(Continued)

OTHER PUBLICATIONS

The World Intellectual Property Organization (WIPO) International Search Report and Written Opinion for PCT/CN2015/082608 dated Sep. 24, 2015 8 Pages.

*Primary Examiner* — Helen Oi K Conley
(74) *Attorney, Agent, or Firm* — Anova Law Group PLLC (57) ABSTRACT

A control circuit for controlling a battery core includes a power input terminal electrically connected to the battery core, a ferromagnetic random access memory having a dynamic mode and a non-volatile mode, and a control unit electrically connected with the ferromagnetic random access memory and the power input terminal. The control unit is configured to acquire state information of the battery core and store the state information to the ferromagnetic random access memory, and switch on or off an electrical connection between the power input terminal and the battery core to switch the ferromagnetic random access memory to the dynamic mode or the non-volatile mode.

17 Claims, 4 Drawing Sheets

(51) Int. Cl.
*H01M 50/10* (2021.01)
*H01M 10/48* (2006.01)

(52) U.S. Cl.
CPC ............... *H01M 50/10* (2021.01); *H02J 7/00* (2013.01); *H01M 2010/4271* (2013.01)

(56) References Cited

U.S. PATENT DOCUMENTS

| | | | |
|---|---|---|---|
| 6,228,519 B1* | 5/2001 | Faris | H01M 4/42 |
| | | | 429/127 |
| 10,491,014 B2* | 11/2019 | Chang | H02J 7/0029 |
| 2008/0185997 A1 | 8/2008 | Fuji | |
| 2009/0185441 A1* | 7/2009 | Kux | G11C 16/14 |
| | | | 365/218 |
| 2012/0206107 A1 | 8/2012 | Ono et al. | |
| 2013/0049703 A1* | 2/2013 | Perisic | H01M 10/44 |
| | | | 320/162 |
| 2015/0022956 A1* | 1/2015 | Olson | H05K 7/00 |
| | | | 361/679.01 |

FOREIGN PATENT DOCUMENTS

| | | | |
|---|---|---|---|
| CN | 1152142 | A | 6/1997 |
| CN | 1307260 | A | 8/2001 |
| CN | 1438747 | A | 8/2003 |
| CN | 1441510 | A | 9/2003 |
| CN | 200979994 | Y | 11/2007 |
| CN | 201821142 | U | 5/2011 |
| CN | 102447277 | A | 5/2012 |
| CN | 103701163 | A | 4/2014 |
| CN | 204696765 | U | 10/2015 |
| EP | 0153837 | A2 | 9/1985 |
| EP | 0620555 | A2 | 10/1994 |
| EP | 1703294 | A1 | 9/2006 |
| JP | H03285522 | A | 12/1991 |
| JP | H06302179 | A | 10/1994 |
| JP | H11283677 | A | 10/1999 |
| JP | H11289681 | A | 10/1999 |
| JP | 2001155781 | A | 6/2001 |
| JP | 2001217012 | A | 8/2001 |
| JP | 2008096140 | A | 4/2008 |
| JP | 2009063502 | A | 3/2009 |
| JP | 2011182592 | A | 9/2011 |
| JP | 2011188570 | A | 9/2011 |
| JP | 2012168728 | A | 9/2012 |
| JP | 2012221854 | A | 11/2012 |

* cited by examiner

CONTROL CIRCUIT, BATTERY HAVING THE CONTROL CIRCUIT AND BATTERY CONTROL METHOD

CROSS-REFERENCE TO RELATED APPLICATION

This is a continuation application of International Application No. PCT/CN2015/082608, filed on Jun. 29, 2015, the entire contents of which are incorporated herein by reference.

TECHNICAL FIELD

The present disclosure relates to a control circuit, a battery having the control circuit and a battery control method.

BACKGROUND

A conventional battery on the market usually includes a control circuit coupled to a battery core to implement many circuit functions such as limiting the minimum discharging voltage and the maximum charging voltage, and detecting the temperature and current of the battery core. However, when the battery core does not supply power to an external load, the control circuit is still in an operating state. For example, a control unit in the control circuit needs to monitor state information of the battery core regularly and store the state information to a register. When the battery core does not supply power to an external load, the control circuit may still consume power, and at this point, the battery is still in a power consumption state.

At present, a common solution is as follows: when the battery is in a power-off state, the control unit detects a voltage of the battery core, and, when the voltage of the battery core is lower than a preset value, sends a corresponding control instruction to cause the battery to enter into a low power consumption state. However, even if the battery enters into the low power consumption state, the battery core still needs to provide a corresponding power supply to maintain a state of the register inside the battery. That is, the battery core cannot completely cut off the power supply of the control circuit, and thus cannot completely eliminate loss of electricity.

SUMMARY

In accordance with the disclosure, there is provided a control circuit for controlling a battery core. The control circuit includes a power input terminal electrically connected to the battery core, a ferromagnetic random access memory having a dynamic mode and a non-volatile mode, and a control unit electrically connected with the ferromagnetic random access memory and the power input terminal. The control unit is configured to acquire state information of the battery core and store the state information to the ferromagnetic random access memory, and switch on or off an electrical connection between the power input terminal and the battery core to switch the ferromagnetic random access memory to the dynamic mode or the non-volatile mode.

Also in accordance with the disclosure, there is provided a battery including a battery core and a control circuit for controlling the battery core. The control circuit includes a power input terminal electrically connected to the battery core, a ferromagnetic random access memory having a dynamic mode and a non-volatile mode, and a control unit electrically connected with the ferromagnetic random access memory and the power input terminal. The control unit is configured to acquire state information of the battery core and store the state information to the ferromagnetic random access memory, and switch on or off an electrical connection between the power input terminal and the battery core to switch the ferromagnetic random access memory to the dynamic mode or the non-volatile mode.

DETAILED DESCRIPTION OF THE EMBODIMENTS

Technical solutions of the present disclosure will be described with reference to the drawings. It will be appreciated that embodiments as described in the disclosure are some rather than all of the embodiments of the present disclosure. Other embodiments, which are conceived by those having ordinary skills in the art on the basis of the disclosed embodiments without inventive efforts, should fall within the scope of the present disclosure.

Figure 1:
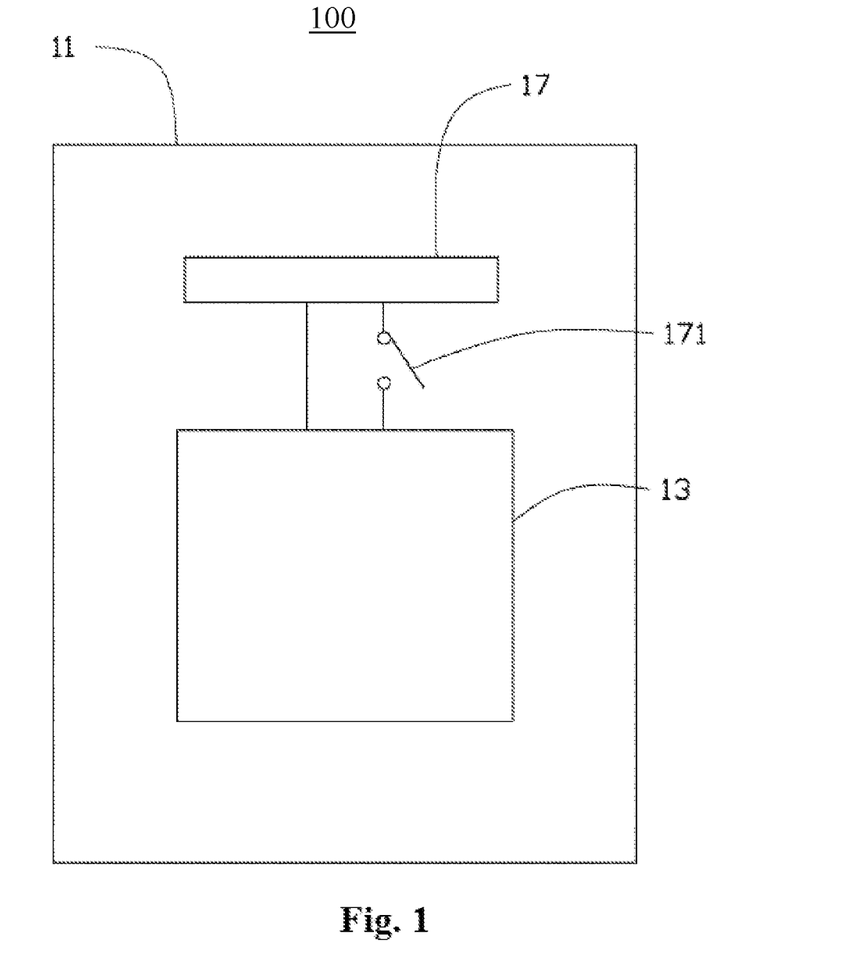
FIG. 1 is a schematic structural diagram of a battery according to an embodiment of the present disclosure.

FIG. 1 schematically shows an example battery 100 consistent with embodiments of the present disclosure. As shown in FIG. 1, the battery 100 includes a housing 11, a battery core 13, and a control circuit 17. The battery core 13 and the control circuit 17 are both disposed in the housing 11. The control circuit 17 includes a switch 171, and the switch 171 is electrically connected to the battery core 13. The battery 100, by controlling on and off of the switch 171, causes the battery core 13 and the control circuit 17 to establish an electrical connection therebetween or to be disconnected from each other, and hence causes the battery core 13, through the switch 171, to provide a power supply for the control circuit 17 or cut off power supply for the control circuit 17.

The switch 171 may include a Metal Oxide Semiconductor Field Effect Transistor (MOS transistor), or may include another electronic switch such as a relay or a mechanical switch. In some embodiments, the switch 171 includes a MOS transistor.

Figure 2:
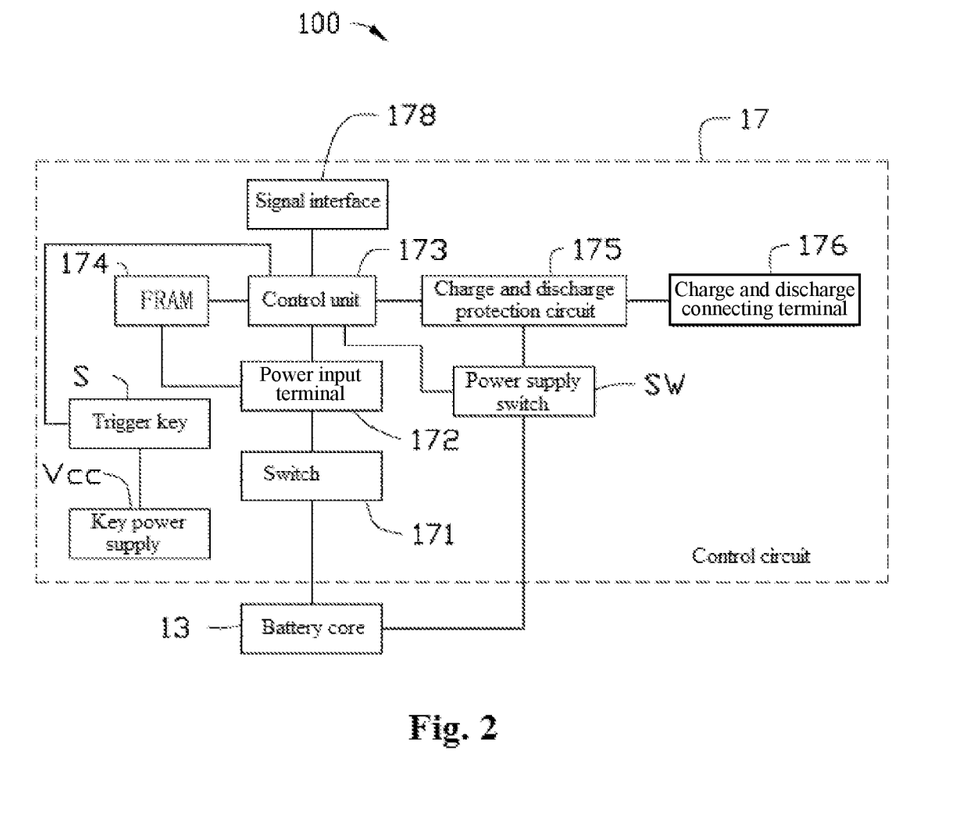
FIG. 2 is one functional module diagram of the battery shown in FIG. 1.

The control circuit 17 may include one or more circuit boards, or include one or more microprocessors. FIG. 2 is a block diagram showing the battery core 13 and the control circuit 17 of the battery 100 according to an embodiment of the disclosure. As shown in FIG. 2, the control circuit 17 further includes a power input terminal 172, a control unit 173, a Ferromagnetic Random Access Memory (FRAM) 174, and a trigger key S. Both the control unit 173 and the FRAM 174 are electrically connected to the power input terminal 172.

The power input terminal 172 is electrically connected to an anode and/or a cathode of the battery core 13 through the switch 171 to receive electric energy output by the battery core 13, and then can serve as a power supply of the control circuit 17 to supply power for operation of the control unit 173 and the FRAM 174.

The control unit 173 may include a Field-Programmable Gate Array (FPGA), a Micro-Controller Unit (MCU) with a control program embedded therein, a single chip microcomputer, or the like. In some embodiments, the control unit 173 includes an MCU.

The FRAM 174 is electrically connected to the control unit 173 and used to store state information of the battery and factory information such as model of the battery core, chemical properties of the battery core, production date of the battery, serial number of the battery, and manufacturer of the battery. The state information of the battery core 13 at least can include a present capacity of the battery core 13, a present voltage of the battery core 13, a present current of the battery core 13, a present battery temperature of the battery core 13, and/or other parameters. The FRAM 174 has advantages of a fast read and write speed and non-volatility, and can allow the battery to rapidly save the present state when shutting down and to rapidly restore the state prior to the last power-off.

In some embodiments, the FRAM 174 may switch between a dynamic mode and a non-volatile mode. When operating in the dynamic mode, the FRAM 174 can have a high dielectric constant because of its special memory structure, and can be used as an ordinary Dynamic Random Access Memory (DRAM). When operating in the non-volatile mode, the FRAM 174, due to a stable state resulting from polarization, can effectively store data even without power. That is, even if the switch 171 is disconnected to stop the battery core 13 from supplying power to the control circuit 17, the FRAM 174 can still effectively operate and has a non-volatile characteristic.

Further, when the switch 171 between the battery core 13 and the control circuit 17 is switched on to cause the battery core 13 to be electrically connected with the control circuit 17, the battery core 13 provides a power supply to the control circuit 17. At this point, the FRAM 174 operates in the dynamic mode. The control unit 173 may perform a read/write operation on the FRAM 174. For example, the state information of the battery core 13 can be stored to the FRAM 174. When the switch 171 between the battery core 13 and the control circuit 17 is switched off to disconnect the battery core 13 from the control circuit 17, the battery core 13 can stop supplying power to the control circuit 17, and the FRAM 174 switches to the non-volatile mode. At this point, the FRAM 174 can still effectively keep the data stored to the FRAM 174 by the control unit 173 to prevent loss of the data.

The trigger key S is configured to control the battery core 13 to power on or power off. For example, when the battery core 13 is in a power-on state, that is, the battery core 13 is supplying power to an external load, if a user presses down the trigger key S, the battery core 13 can switch to a power-off state. When the battery core 13 is in a power-off state, that is, the battery core 13 is not supplying power to an external load, if the user presses down the trigger key S, the battery core 13 will switch to the power-on state. That is, the battery core 13 restores power supply to an external load. Furthermore, the trigger key S is electrically connected with the control unit 173. The trigger key S is used to send a trigger signal to the control unit 173, and the control unit 173 controls on and off of the switch 171 in accordance with the trigger signal.

In some embodiments, the control circuit 17 further includes a key power supply Vcc. The trigger key S is electrically connected with the key power supply Vcc. When the trigger key S controls the battery core 13 to switch to the power-off state, the key power supply Vcc can temporarily supply power to the control unit 173 through the trigger key S. At this point, the control unit 173 can store the present state information to the FRAM 174, and control the switch 171 to switch off to disconnect the battery core 13 from the control circuit 17. That is, the battery core 13 can cut off the power supply to the control circuit 17 to reduce the power consumption of the control circuit 17 to zero, thereby effectively extending storage life of the battery 100. When the battery core 13 is controlled, through the trigger key S, to switch to the on state, the key power supply Vcc can temporarily supply power to the control unit 173 through the trigger key S. At this point, the control unit 173 can control the switch 171 to switch on, so as to establish an electrical connection between the battery core 13 and the control circuit 17 to allow the battery core 13 to continue to supply power for the control circuit 17. At the same time, the FRAM 174 can switch to the dynamic mode again to allow the control unit 173 to perform the read/write operation on the FRAM 174. That is, the control circuit 17 can resume normal operation, and continue to operate in accordance with the state before last shutdown.

It can be understood that, in some other embodiments, the key power supply Vcc may be omitted and the trigger key S can be directly electrically connected to the battery core 13. In these embodiments, when the trigger key S is triggered, the battery core 13 may temporarily supply power to the control unit 173 directly through the trigger key S.

As shown in FIG. 2, the control circuit 17 further includes a charge and discharge protection circuit 175 and a charge and discharge connecting terminal 176. The charge and discharge protection circuit 175 is electrically connected to the control unit 173. The battery core 13 may be charged or supply power to an external load through the charge and discharge protection circuit 175. The charge and discharge connecting terminal 176 is electrically connected to the charge and discharge protection circuit 175. The charge and discharge connecting terminal 176 can be electrically connected with an external device (not shown) and hence can server as a charge and discharge interface of the battery 100. For example, when the battery core 13 is electrically connected to the external device through the charge and discharge connecting terminal 176, the external device can charge the battery 100 through the charge and discharge connecting terminal 176.

In some embodiments, as shown in FIG. 2, the control circuit 17 further includes a power supply switch SW. The power supply switch SW is electrically connected between the charge and discharge protection circuit 175 and the battery core 13, and is electrically connected with the control unit 173. The control unit 173 can control the electrical connection between the battery core 13 and the charge and discharge protection circuit 175 through the power supply switch SW, and further control of the electrical connection between the battery core 13 and the external device through the charge and discharge protection circuit 175.

In some other embodiments, the power supply switch SW can be omitted from the control circuit 17. Instead, the charge and discharge protection circuit 175 can be electrically connected with the battery core 13 through the switch 171. In these embodiments, the control unit 173 can control of the electrical connection between the battery core 13 and the charge and discharge protection circuit 175 through the switch 171, and further control the electrical connection between the battery core 13 and the external device through the charge and discharge protection circuit 175. In some other embodiments, if the charge and discharge protection circuit 175 has a switch function, the charge and discharge protection circuit 175 can be electrically connect with the control unit 173 and the battery core 13 directly. In these embodiments, the control unit 173 can control the electrical connection between the battery core 13 and the charge and discharge protection circuit 175 through on and off of the charge and discharge protection circuit 175, and further control the electrical connection between the battery core 13 and the external device through the charge and discharge protection circuit 175.

In some embodiments, as shown in FIG. 2, the control circuit 17 further includes a signal interface 178. The signal interface 178 is electrically connected with the control unit 173 and can be configured to establish an electrical connection between the control circuit 17 and another external apparatus, for example, an unmanned aerial vehicle, so as to enable the external apparatus to conduct data communication with the control circuit 17.

When the battery core 13 is in the power-on state, the control circuit 17 can operate normally. At this point, the FRAM 174 of the control circuit 17 can operate in the dynamic mode, and the control unit 173 can acquire the state information of the battery core 13 periodically or in real time and write the acquired state information into the FRAM 174. If the user presses down the trigger key S, the battery core 13 can switch to the power-off state. At this point, the battery core 13 or the key power supply Vcc can temporarily supply power to the control unit 173 through the trigger key S, and the control unit 173 can acquire the state information of the battery core 13 and store the state information to the FRAM 174. Next, the control unit 173 can switch off the switch 171 to disconnect the battery core 13 from the control circuit 17. That is, the battery core 13 can cut off the power supply of the control circuit 17. At this point, the control circuit 17 can stop operating to reduce the power consumption thereof to zero, thereby effectively extending storage life of the battery 100. In addition, when the battery core 13 cuts off the power supply of the control circuit 17, the FRAM 174 can switch to the non-volatile mode. Therefore, even if the battery core 13 is disconnected from the control circuit 17, the FRAM 174 can still effectively keep the state information of the battery core 13 to prevent loss of the data.

In some other embodiments, the control unit 173 includes a mechanical switch. If the user presses down the mechanical switch, the battery core 13 can switch to the power-off state, and the FRAM 174 can save the state information of the battery core 13 prior to the power-off.

When the battery core 13 is in the power-off state and the user presses down the trigger key S again, the battery core 13 can switch to the power-on state. At this point, the battery core 13 or the key power supply Vcc can temporarily supply power to the control unit 173 through the trigger key S. The control unit 173 can control the switch 171 to switch on, and then an electrical connection between the battery core 13 and the control circuit 17 can be established to allow the battery core 13 to continue to supply power for the control circuit 17. At the same time, the FRAM 174 can switch to the dynamic mode again to facilitate the control unit 173 to perform the read/write operation on the FRAM 174. In this way, the control circuit 17 can continue to operate in accordance with the state before the last shutdown.

Figure 3:
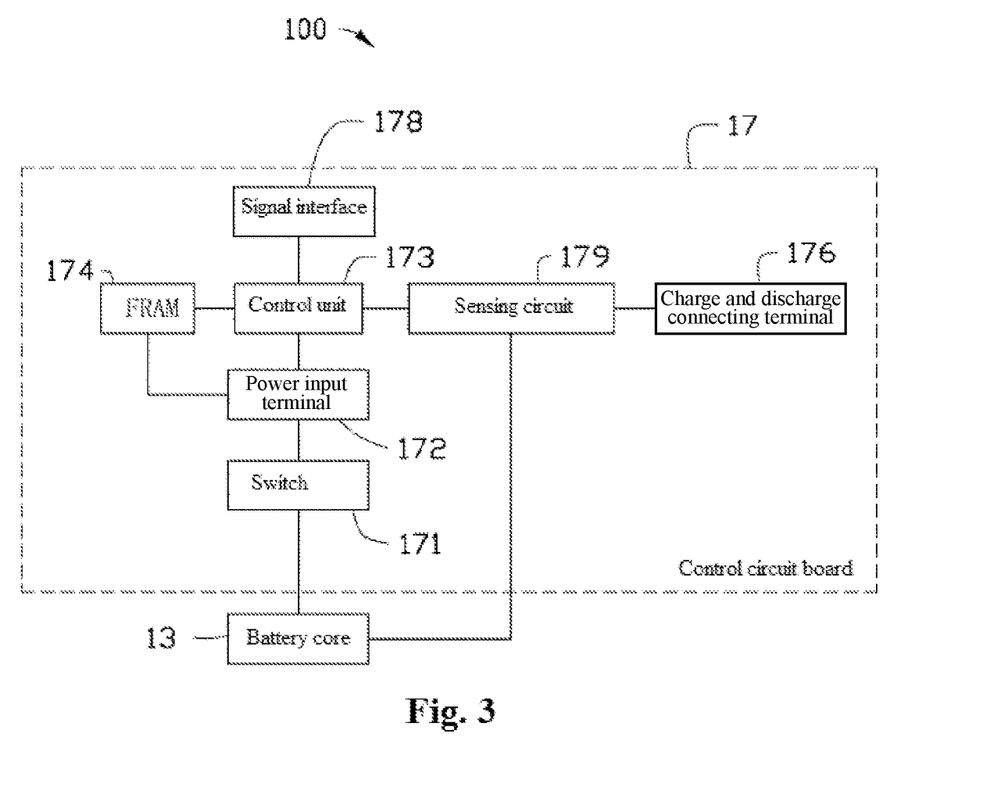
FIG. 3 is another functional module diagram of the battery shown in FIG. 1.

FIG. 3 is a block diagram showing the battery core 13 and the control circuit 17 according to another embodiment of the disclosure. In the example shown in FIG. 3, the trigger key S is omitted. In these embodiments, as shown in FIG. 3, the control circuit 17 further includes a sensing circuit 179. The charge and discharge connecting terminal 176 is electrically connected with the battery core 13 through the sensing circuit 179. The sensing circuit 178 is further electrically connected with the control unit 173 and used to sense whether the charge and discharge connecting terminal 176 is in electrical communication with an external device. If the sensing circuit 178 senses that the charge and discharge connecting terminal 176 is in electrical communication with the external device, the control unit 173 controls the switch 171 to switch on. When the sensing circuit 178 senses that the charge and discharge connecting terminal 176 is not in electrical communication with the external device, the control unit 173 controls the switch 171 to switch off.

Figure 4:
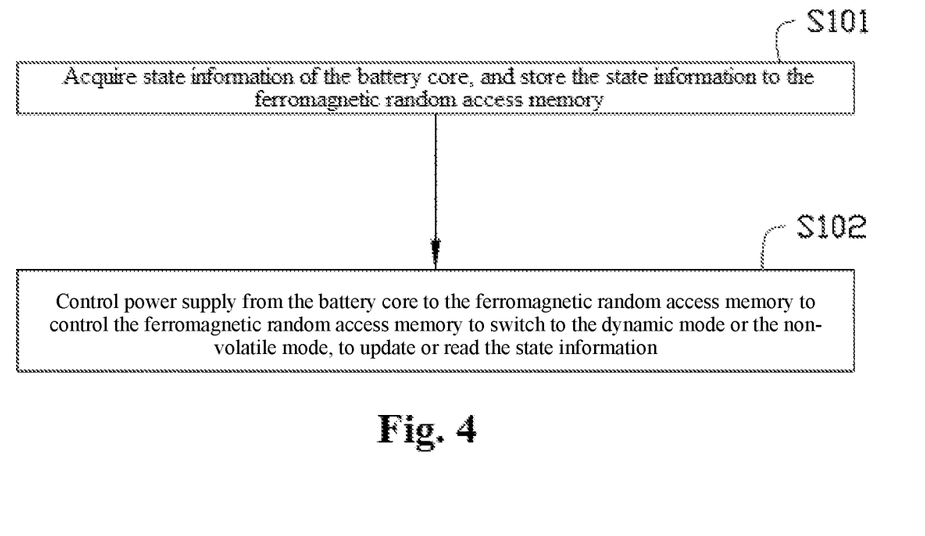
FIG. 4 is a schematic flow chart of a battery control method according to an embodiment of the present disclosure.

FIG. 4 a schematic flow chart of a battery control method according to an embodiment of the present disclosure. The method can be implemented in control unit, such as the control unit 173 shown in FIG. 2 or 3.

As shown in FIG. 4, at S101, the state information of the battery core 13 is acquired, and the state information is stored into the FRAM 174.

The state information includes at least one of the followings: a capacity of the battery core 13, a voltage of the battery core 13, a current of the battery core 13, or a battery temperature of the battery core 13.

At S102, power supply from the battery core 13 to the FRAM 174 is controlled, to control the FRAM 174 to switch to the dynamic mode or the non-volatile mode to update or read the state information.

As described above, the battery 100 further includes the switch 171. The switch 171 is electrically connected with the battery core 13 and the FRAM 174. The control unit 173, by switching on or switching off the switch 171, can establish or disconnect the electrical connection between the FRAM 174 and the battery core 13.

As described above, the battery core 13 has a power-on state and a power-off state. When the battery core 13 is switched to the power-off state, the control unit 173 can store the state information to the FRAM 174. When the battery core 13 switches to the power-on state, the control unit 173 may acquire the state information from the FRAM 174.

As described above, the battery 100 further includes the trigger key S. The trigger key S is configured to control on or off of the battery core 13. For example, when the battery core 13 is in the power-on state, that is, the battery core 13 is supplying power to an external load, if a user presses down the trigger key S, the battery core 13 switches to the power-off state. When the battery core 13 is in the power-off state, that is, the battery core 13 is not supplying power to an external load, if the user presses down the trigger key S again, the battery core 13 will switch to the power-on state. That is, the battery core 13 restores the power supply to an external load.

In some embodiments, the trigger key S is electrically connected with the control unit 173. The trigger key S is configured to send a trigger signal to the control unit 173, and the control unit 173 controls the on and off of the switch 171 in accordance with the trigger signal.

In some embodiments, the trigger key S may be electrically connected to the battery core 13. Therefore, when the trigger key S is triggered, the battery core 13 can temporarily supply power to the control unit 173 directly through the trigger key S.

In some embodiments, the battery 100 further includes the key power supply Vcc electrically connected with the trigger key S. The key power supply Vcc can temporarily supply power to the control unit 173 through the trigger key S.

In some embodiments, the control circuit 17 further includes the charge and discharge connecting terminal 176. The control unit 173 can control the electrical connection between the FRAM 174 and the battery core 13 in accordance with the electrical connection between the charge and discharge connecting terminal 176 and the external device.

The aforementioned battery 100 may cut off the power supply of the control circuit 17 to reduce power consumption of the control circuit 17 to zero. The problem of overdischarge of the battery core 13 can be avoided, and storage time of the battery 100 can be effectively extended. At the same time, the control circuit 17 includes the FRAM 174. Therefore, even if the battery core 13 is in a power-off state, the FRAM 174 can still effectively hold data to prevent information loss. That is, the control circuit 17 and the battery 100 having the control circuit 17 can effectively reduce power consumption, and can also effectively hold data to prevent information loss.

The foregoing are merely some embodiments of the disclosure but are not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A control circuit for controlling a battery core, comprising:
    a power input terminal electrically connected to the battery core;
    a ferromagnetic random access memory, the ferromagnetic random access memory having a dynamic mode and a non-volatile mode;
    a control unit electrically connected with the ferromagnetic random access memory and the power input terminal, the control unit being configured to:
        acquire state information of the battery core and store the state information to the ferromagnetic random access memory, and
        switch on or off an electrical connection between the power input terminal and the battery core to switch the ferromagnetic random access memory to the dynamic mode or the non-volatile mode;
    a charge and discharge protection circuit electrically connected to the control unit and the battery core, the battery core being charged or supplying power to an external load through the charge and discharge protection circuit;
    a charge and discharge connecting terminal electrically connected to the charge and discharge protection circuit and configured to be electrically connected with an external device; and
    a trigger key configured to receive a user manual operation to control the battery core to switch between a power-on state and a power-off state;
    wherein the control unit is further configured to:
        in response to the trigger key controlling the battery core to switch to the power-off state, store the state information to the ferromagnetic random access memory; and
        in response to the trigger key controlling the battery core to switch to the power-on state, acquire the state information from the ferromagnetic random access memory.

2. The control circuit of claim 1, wherein the control unit includes a Field-Programmable Gate Array (FPGA), a Micro-Controller Unit (MCU) with a control program embedded therein, or a single chip microcomputer.

3. The control circuit of claim 1, wherein the state information comprises at least one of a capacity of the battery core, a voltage of the battery core, a current of the battery core, or a battery temperature of the battery core.

4. The control circuit of claim 1, wherein:
    the trigger key is electrically connected with the control unit and configured to send a trigger signal to the control unit, and
    the control unit is configured to control the electrical connection between the power input terminal and the battery core in accordance with the trigger signal.

5. The control circuit of claim 1, wherein:
    the trigger key is electrically connected with the battery core, and
    the battery core is configured to temporarily supply power to the control unit through the trigger key when the trigger key is triggered.

6. The control circuit of claim 1, further comprising:
    a key power supply electrically connected with the trigger key, the key power supply being configured to temporarily supply power to the control unit through the trigger key when the trigger key is triggered.

7. The control circuit of claim 1, further comprising:
    a sensing circuit electrically connected with the control unit and configured to sense whether the charge and discharge connecting terminal is in electrical communication with the external device, wherein:
    the charge and discharge connecting terminal is electrically connected with the battery core through the sensing circuit; and
    the control unit is further configured to:
        switch on the electrical connection between the power input terminal and the battery core when the sensing circuit senses that the charge and discharge connecting terminal is in electrical communication with the external device, and
        switch off the electrical connection between the power input terminal and the battery core when the sensing circuit senses that the charge and discharge connecting terminal is not in electrical communication with the external device.

8. The control circuit of claim 1, wherein:
    the charge and discharge protection circuit has a switch function, and
    the control unit is configured to control an electrical connection between the battery core and the external device through the charge and discharge protection circuit.

9. The control circuit of claim 1, further comprising:
    a power supply switch electrically connected between the charge and discharge protection circuit and the battery core and electrically connected with the control unit,
    wherein the control unit is configured to control an electrical connection between the battery core and the external device through the power supply switch.

10. The control circuit of claim 1, further comprising:
    a switch,
    wherein:
        the power input terminal is electrically connected to the battery core through the switch, and
        the control unit is configured to switch on or off the electrical connection between the power input terminal and the battery core by switching on or off the switch.

11. The control circuit of claim 10, wherein the switch includes a Metal Oxide Semiconductor Field Effect Transistor, a relay, or a mechanical switch.

12. The control circuit of claim 10, wherein:
the charge and discharge protection circuit is electrically connected with the battery core through the switch, and
the control unit is configured to control an electrical connection between the battery core and the external device through the switch.

13. The control circuit of claim 1, further comprising:
a signal interface electrically connected to the control unit, and electrically connecting the control circuit to an external apparatus through the signal interface for conducting data communication with the external apparatus.

14. A battery comprising:
a battery core; and
a control circuit for controlling the battery core, the control circuit comprising:
   a power input terminal electrically connected to the battery core;
   a ferromagnetic random access memory, the ferromagnetic random access memory having a dynamic mode and a non-volatile mode;
   a control unit electrically connected with the ferromagnetic random access memory and the power input terminal, the control unit being configured to:
      acquire state information of the battery core and store the state information to the ferromagnetic random access memory, and
      switch on or off an electrical connection between the power input terminal and the battery core to switch the ferromagnetic random access memory to the dynamic mode or the non-volatile mode;
   a charge and discharge protection circuit electrically connected to the control unit and the battery core, the battery core being charged or supplying power to an external load through the charge and discharge protection circuit;
   a charge and discharge connecting terminal electrically connected to the charge and discharge protection circuit and configured to be electrically connected with an external device; and
   a trigger key configured to receive a user manual operation to control the battery core to switch between a power-on state and a power-off state;
   wherein the control unit is further configured to:
      in response to the trigger key controlling the battery core to switch to the power-off state, store the state information to the ferromagnetic random access memory; and
      in response to the trigger key controlling the battery core to switch to the power-on state, acquire the state information from the ferromagnetic random access memory.

15. The battery of claim 14, further comprising:
a housing accommodating the battery core and the control circuit.

16. The battery of claim 14, wherein the state information comprises at least one of a capacity of the battery core, a voltage of the battery core, a current of the battery core, or a battery temperature of the battery core.

17. The control circuit of claim 1, wherein the state information includes a capacity of the battery core.

* * * * *